United States Patent
Braithwaite

(10) Patent No.: US 6,540,392 B1
(45) Date of Patent: Apr. 1, 2003

(54) MICRO-ILLUMINATOR FOR USE WITH IMAGE RECOGNITION SYSTEM

(75) Inventor: Michael Braithwaite, Langhorne, PA (US)

(73) Assignee: Sensar, Inc., Moorestown, NJ (US)

( * ) Notice: Subject to any disclaimer, the term of this patent is extended or adjusted under 35 U.S.C. 154(b) by 0 days.

(21) Appl. No.: 09/539,974

(22) Filed: Mar. 31, 2000

(51) Int. Cl.⁷ .................................................. F21K 7/00
(52) U.S. Cl. ...................... 362/572; 362/231; 362/800; 362/553; 362/554
(58) Field of Search ................................ 362/800, 555, 362/581, 539, 231, 244, 328, 554, 553; 235/462; 313/498

(56) References Cited

U.S. PATENT DOCUMENTS

| | | | |
|---|---|---|---|
| 3,582,637 A | * 6/1971 | Cecil, Jr. .......................... 240/1 |
| 4,948,214 A | 8/1990 | Hamblen ..................... 350/413 |
| 5,016,282 A | 5/1991 | Tomono et al. | |
| 5,231,684 A | 7/1993 | Narciso, Jr. et al. .......... 385/80 |
| 5,751,836 A | 5/1998 | Wildes et al. | |
| 5,864,128 A | * 1/1999 | Plesko .......................... 235/462 |
| 6,007,218 A | * 12/1999 | German et al. .............. 362/259 |
| 6,220,725 B1 | * 4/2001 | Arnold .......................... 362/241 |
| 6,249,375 B1 | * 6/2001 | Silkengst et al. ............ 362/800 |
| 6,302,570 B1 | * 10/2001 | Petell et al. .................. 362/554 |
| 6,217,188 B1 | * 4/2002 | Wainwright et al. ......... 362/103 |
| 6,275,633 B1 | * 8/2002 | Lei ............................. 385/100 |

OTHER PUBLICATIONS

Camus, T., et al., "Sensar . . . Secure™ Iris Identification System," *IEEE*, 1998, XP–001020339, 254 (1 page).

* cited by examiner

*Primary Examiner*—Sandra O'Shea
*Assistant Examiner*—Anabel Ton
(74) *Attorney, Agent, or Firm*—Woodcock Washburn LLP

(57) ABSTRACT

A micro-illuminator suitable for illuminating the iris of the eye of a subject wearing eyeglasses for the purpose of imaging of the iris for identification of the individual comprises an LED having a micro-lens having an opaque portion sized to block light reflected from the substrate of an LED and a lens for focusing light directly emitted by the dies of the LED. The elimination of the reflected light and the focusing of the directly emitted light minimizes the size of specularities reflected from the surfaces of the subject's eyeglasses.

2 Claims, 10 Drawing Sheets

MICRO-ILLUMINATOR FOR USE WITH IMAGE RECOGNITION SYSTEM

FIELD OF THE INVENTION

The current invention relates to the field of the identification of individuals using biometrics, and, in particular to the method of using a scan of the iris of the eye of the individual to make a positive identification.

BACKGROUND OF THE INVENTION

An iris recognition system consisting of a CCD, or CMOS type sensor and an illumination system work together to provide an iris image of sufficient exposure and detail to obtain the critical iris texture required for a positive identification of an individual. Common illumination techniques for typical CCD or CMOS sensors use light in the visible and infrared wavelengths.

A problem arises when utilizing this system to identify individuals wearing eyeglasses. To illuminate the individual's iris, narrow (spot) light beams are preferred. These illuminators cause reflections in the glasses of the individual, thereby occluding portions of the iris needed for iris recognition. These occlusions, called specularities, occur when the spot light beams reflect off of each surface of the lens of the individual's glasses, that is, the surface encountered when the light enters the lens and the second surface encountered when the when the light leaves the lens. Thus, for each spot light source, there will be a pair of specularities visible from the perspective of the sensor. A similar problem can occur when one seeks to take an image or see a product contained in a transparent container, such as a glass jar or a blister package.

This problem can be addressed by adopting a dipole configuration of illuminators, with one illuminator being offset to the right of the sensor and one illuminator being offset to the left of the sensor. This configuration does not eliminate the specularities, but moves them away from the iris. As the angle from each illuminator to the sensor widens, the specularity will move away from the center of the image as seen by the sensor, such that the important areas of the iris or other object of interest are no longer occluded. Two illuminators are required to offset a gradient of illumination as seen by the sensor because the source of the light is moved to the side.

There are, however, disadvantages to this solution. First, two illuminators are required as opposed to just one, increasing production costs and requiring more power to operate. Second, the pair of illuminators must be spaced far enough apart such that the specularities introduced by each illuminator is far enough offset from the center of the images as seen by the sensor so as to not occlude important parts of the iris. This requires a larger housing than would otherwise be necessary, and as a result, a larger footprint for the overall unit.

Therefore, it is desirable that a single illuminator in a monopole configuration be utilized to illuminate the individual's iris, or the object contained within a transparent container, thereby reducing the number of specularities. It is also desirable to minimize the effects of the specularities that are introduced by the illuminator by making the specularities smaller in size, while still supplying enough light energy on the object to support the image sensor aperture and depth of field requirements.

SUMMARY OF THE INVENTION

The invention consists of a micro-lens which, when fitted to the appropriate illuminator, will focus the beam of light on the iris and at the same time block a portion of the light emitted. The design goal is to reduce the size of the specularity such that, even though a portion of the iris may be occluded, the amount of information that is missing is statistically insignificant, to the point that a positive identification can still be made.

In the preferred embodiment, the illuminator is a commercially available light emitting diode (LED). Preferably, the LED will have a pair of dies, one die emitting infrared light having a wavelength of approximately 880 nm, and one die emitting visible light having a wavelength of approximately 730 nm. A single die configuration may also be used, as may illuminators which are not light emitting diodes.

Preferably, the illuminator with the micro lens will be placed very near the sensor, in a monopole configuration. In such a configuration, any tilting of the head of the individual offaxis from the sensor will move the specularity out of the way of the iris, as opposed to the dipole configuration, in which a tilting of the head would move one pair of specularities away from the iris, but would also move the other pair of specularities toward the iris.

To focus the emitted light, the micro-lens is designed so that when coupled to the LED, the emitted light view angle is reduced and the projected area is reduced. The light view angle, or field of view (FOV) is controlled by the lens focal length. A longer focal length focuses more light on the target eye as compared to the stand-alone LED.

The aperture of the micro-lens determines the incident specularity size. Consequently, a reduction in lens aperture will reduce the incident specularity size. The micro-lens has an aperture no larger than the die pair in a dual-configuration LED, and no larger than a single die in a single configuration LED. The result is an illuminator that generates smaller spectral reflections on the eyeglasses, while still adequately illuminating the iris.

The micro-lens will also block a portion of the emitted light. The total light emitted, in the case of an LED, has a component that is emitted directly from the die and a component that is reflected off of the substrate to which the die(s) is bonded. In many cases, the substrate is gold. The goal is to eliminate or to reduce as much as possible the light which is being reflected off of the substrate, leaving only the light which is emitted directly from the die. This provides the minimum sized specularity for the maximum amount of emitted light.

The masking of the reflected portion of the light is accomplished by way of an opaque material which surrounds the focusing portion of the micro-lens. The opaque material would be donut-shaped, with the hole containing the focusing portion of the lens just big enough to allow all light from the die to project. This configuration is unable to eliminate all of the reflected light because the hole is circular, and the dies are usually rectangular in shape. Additionally, in the case of a dual-die configuration, light reflected from the portion of the substrate in between the dies will be allowed to project. In both cases, however, the reflected light which projects due to the geometry of the lens is a small percentage of the entire light and does not add much to the size of the specularities.

DESCRIPTION OF THE DRAWINGS

FIG. 1b is a photograph of the eye shown schematically in FIG. 1a.

FIG. 2b is a photograph of the eye shown schematically in FIG. 2a.

DETAILED DESCRIPTION

Figure 1A:
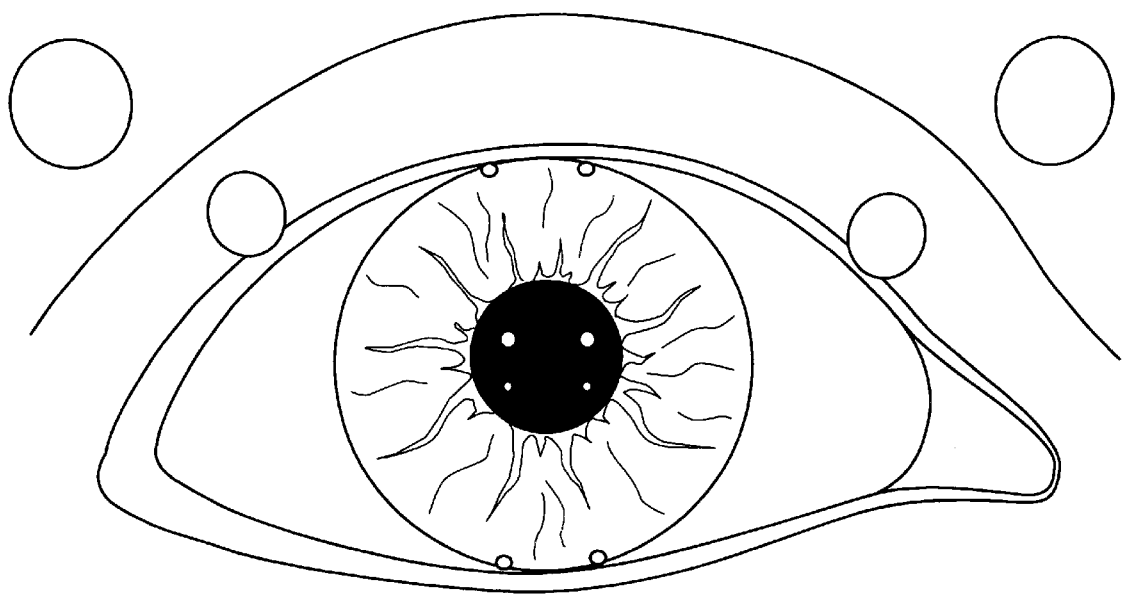
FIG. 1a is a schematic view of an eye showing specularities generated by a dipole illumination configuration.
Figure 1B:
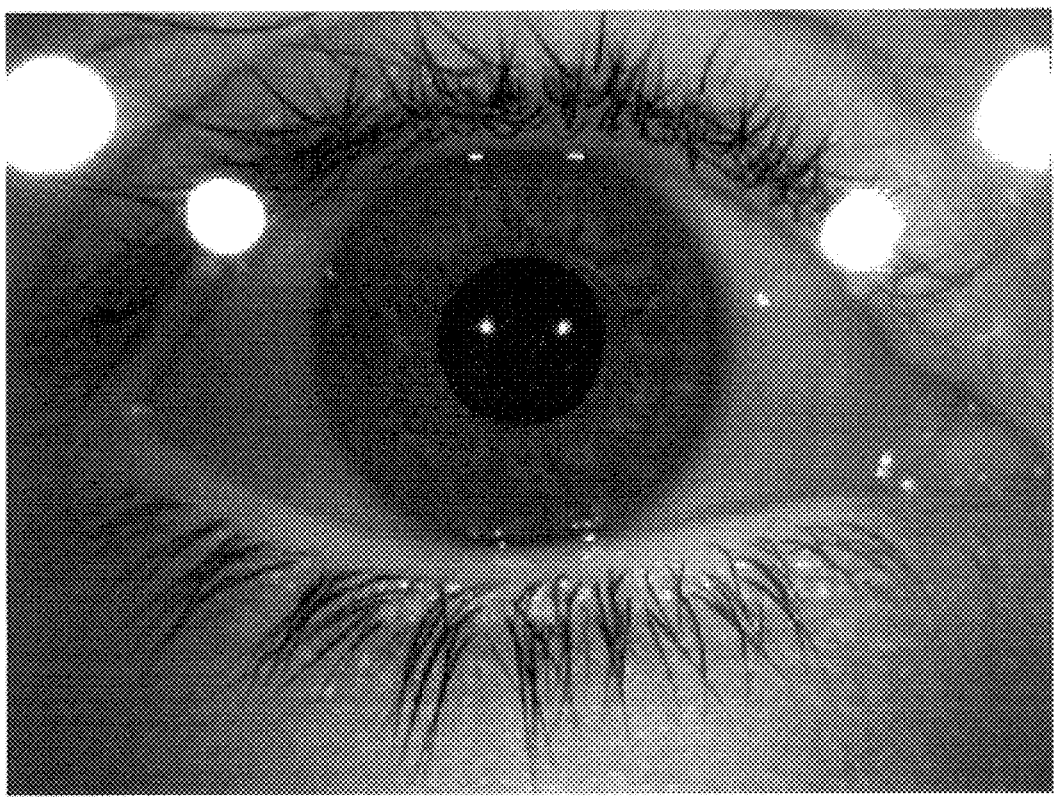

FIG. 1 shows the specularities resulting from the use of the dipole configuration described earlier. The photograph clearly shows four large specularities 2, 3, 4 and 5. Specularities 2 and 3 are caused by the reflection of the left most illuminator off of the front and rear surfaces respectively of the lens of the individual's glasses. Specularities 4 and 5 are caused by the reflection of the right most illuminator off the front and rear surfaces respectively of the lens of the individual's glasses. While these specularities are not currently occluding any portion of the iris, any slight tilt of the head will cause one of the pairs of specularities to move into an area where a portion of the iris is occluded. The other pair of specularities will move away from the iris. The two smaller specularities shown in the pupil of the eye and the four small specularities shown in the iris of the eye are caused by reflections of the illuminators off of the actual eye. These specularities are so small as to be statistically insignificant with respect to the iris identification process.

Figure 2A:
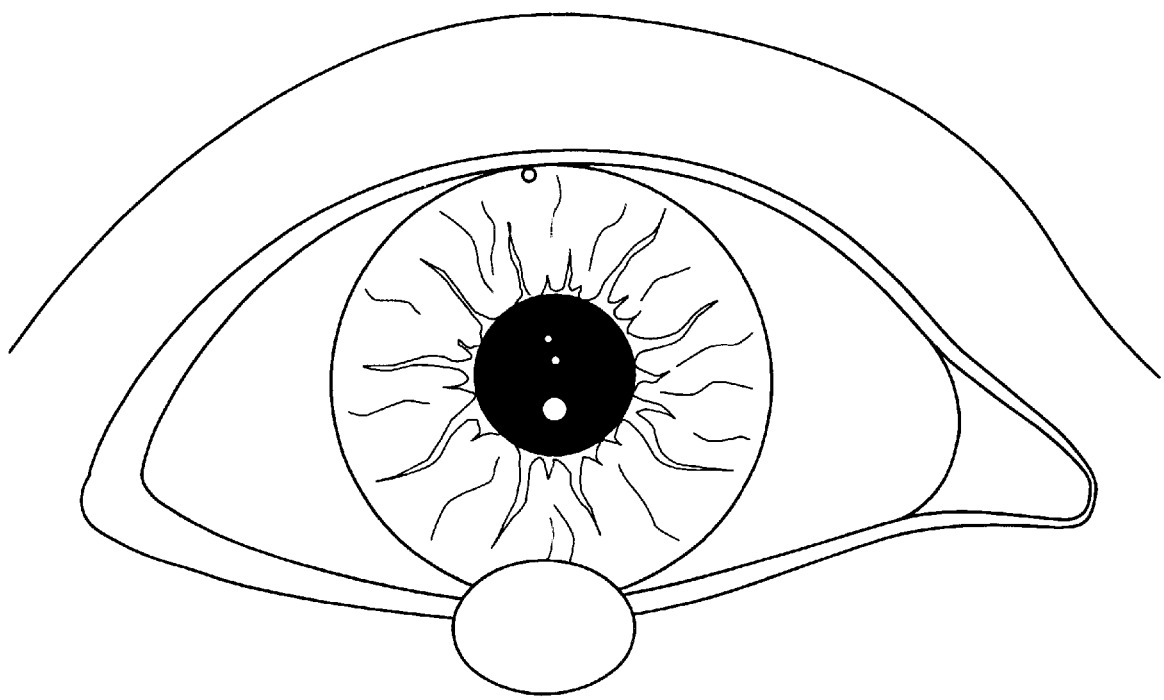
FIG. 2a is a schematic view of an eye showing specularities generated by a mono-pole illumination configuration.
Figure 2B:
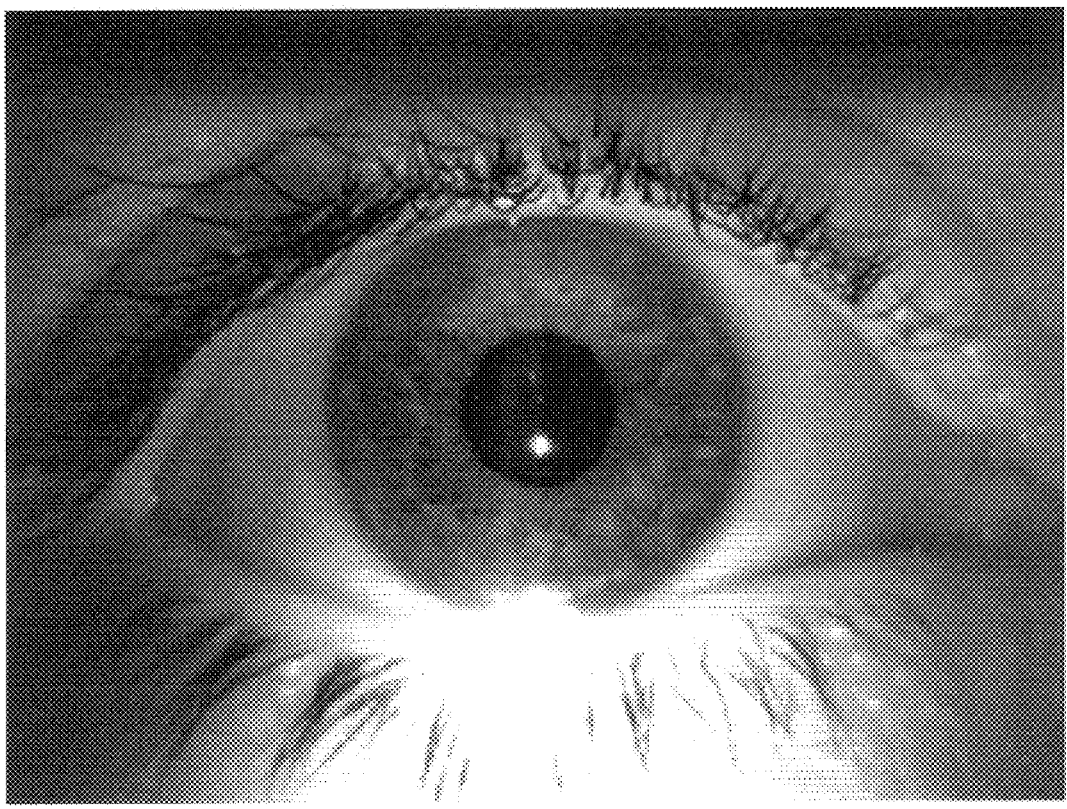

FIG. 2 shows the specularities generated with the monopole configuration with an illuminator having a micro lens attached thereto in accordance with this invention. The specularity labeled 8 is actually a composite of a pair of specularities, one generated by the reflection off of the front surface of the lens of the glasses and one generated from the reflection off of the rear surface of the lens of the glasses. As the user tilts his head left or right, the specularities will separate and move away from the iris. Thus, for purposes of imaging of the iris, the monopole illuminator configuration is preferred over the dipole configuration, as the tilting of the head will cause the specularities to move away from the iris in the monopole configuration but will cause one of the pair of specularities to move into the iris in the dipole configuration.

Figure 3A:
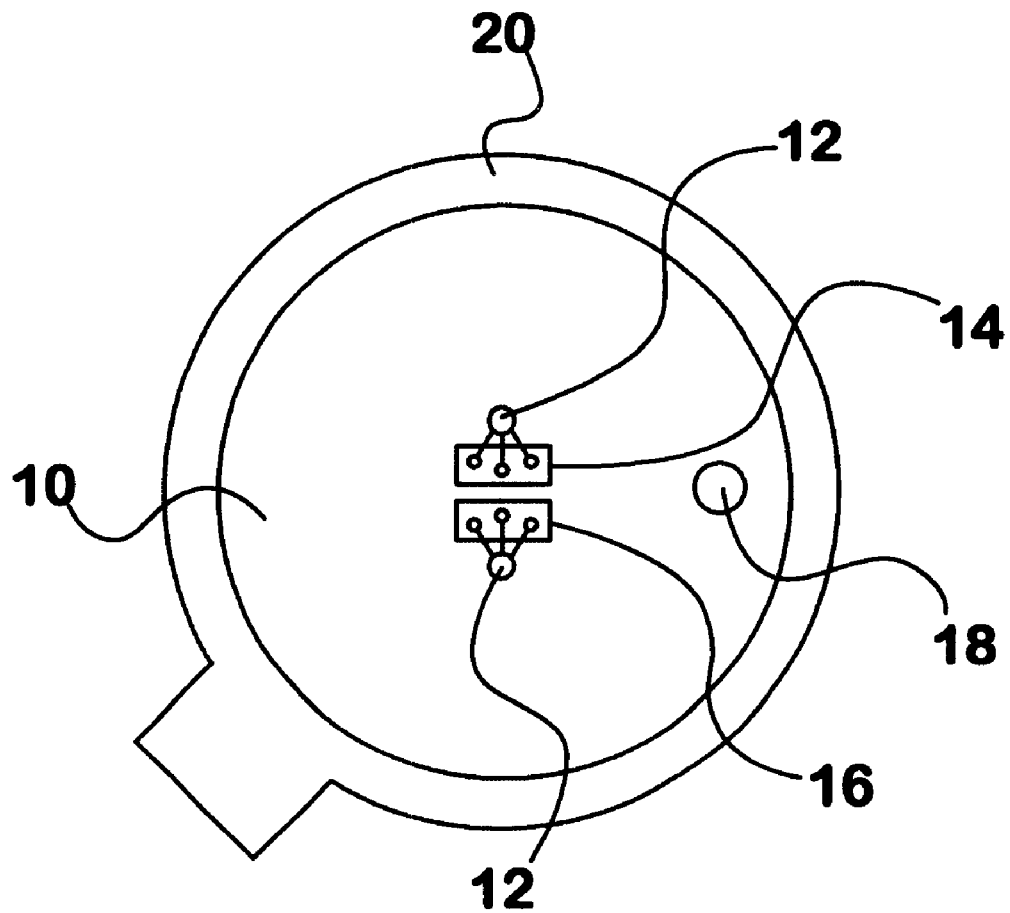
FIGS. 3a and 3b show a commercially available LED without a lens attached.
Figure 3B:
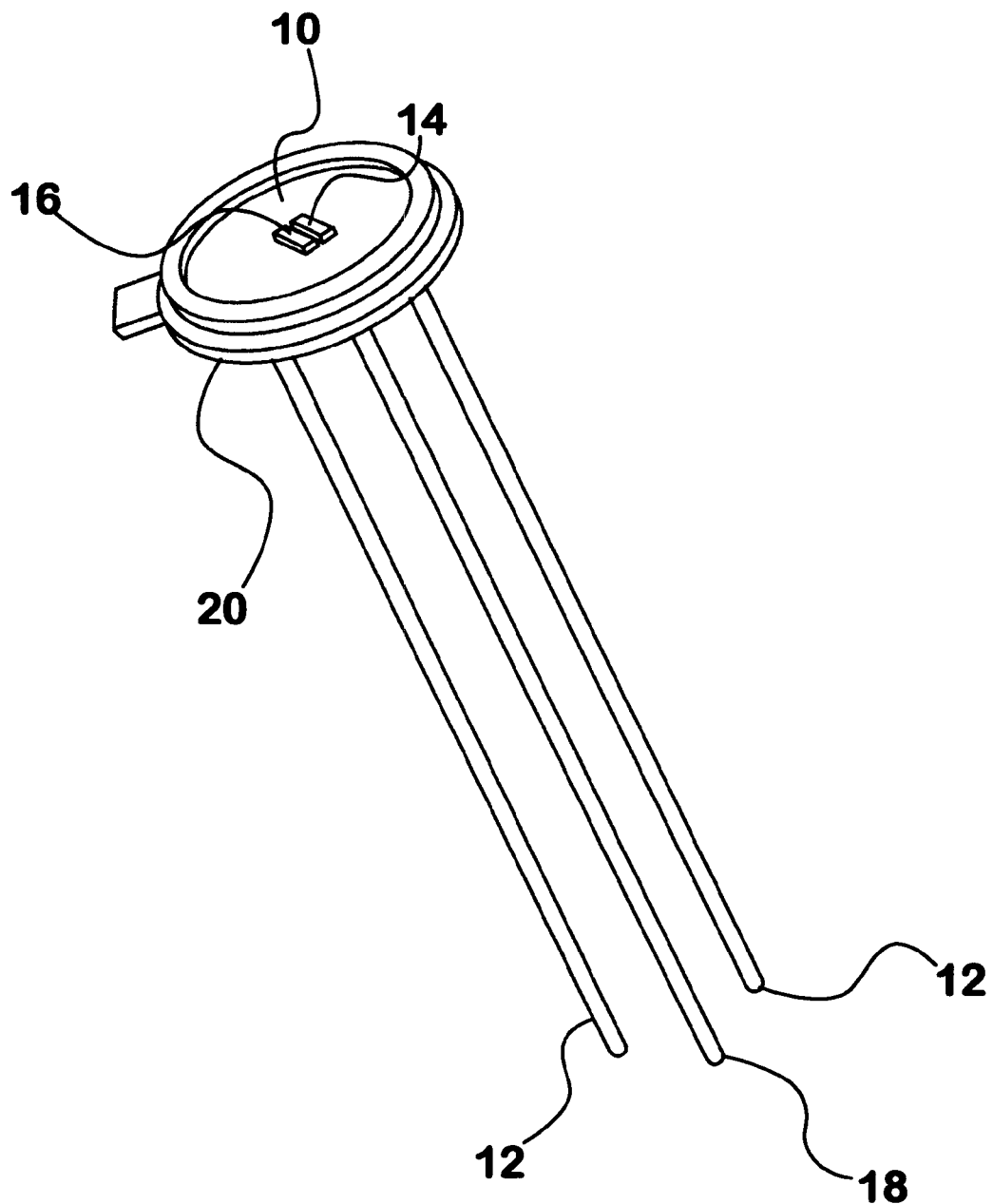

FIGS. 3a and 3b show a typical dual configured light emitting diode (LED) existing in the art. For the purposes of this disclosure, the term LED is intended to include commercially available or custom made LEDs, with or without an attached lens. Housing 20 contains substrate 10, which is typically comprised of gold for LEDs useful for this purpose. Die 14 is a visible light die typically emitting light having a wavelength of approximately 730 nm, while die 16 is an infrared die emitting light with a wavelength of approximately 880 nm. Leads 12 and anode 18 are the sources of the voltage differentials which causes the die to emit the light.

Figure 4:
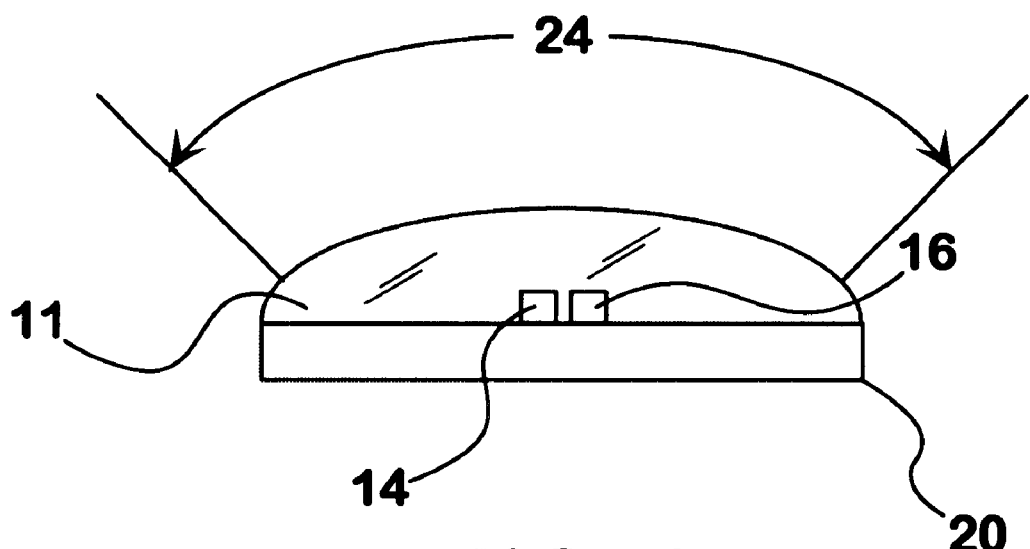
FIG. 4 shows a normal commercially available LED with the angle of the light beam indicated.

FIG. 4 shows a side view of a typical LED having a typical lens 11 attached thereto. The angle 24 at which light is emitted from the LED and focused by lens 11 in commercially available LEDs is typically between 15° and 120°. To be effective for illuminating the iris for the purposes of imaging without creating large specularities, the FOV must be narrowed. The desired FOV is dependent upon several factors, including the distance to the object being illuminated and the width of the area which is being illuminated. In any case, the desired angle is given by the formula:

$$\text{arc tan}(W/D),$$

where W is the width of the area which is being illuminated and D is the distance from the micro-illuminator to the target area. Typically, for an apparatus which is imaging one eye only, the width of the area to be illuminated is between 3" and 5". Likewise, the distance would vary from a minimum of about 10" to a maximum of about 36". Thus, the angle for one eye may vary from between about 5° to about 26.5°. When imaging two eyes, the width of the target area could increase up to about 10", yielding a field of view of between about 15° to about 45°.

Figure 5A:
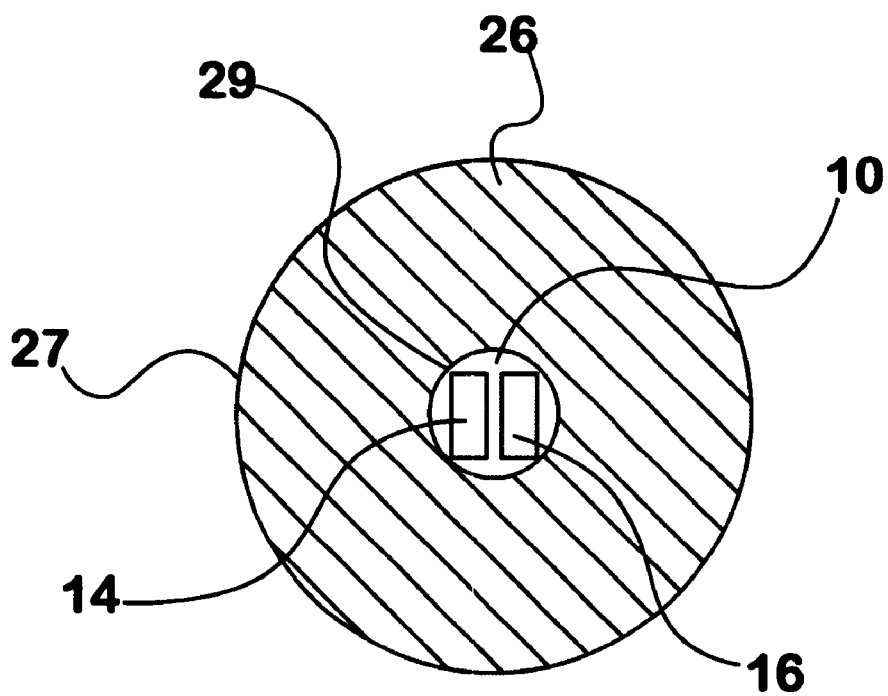
FIGS. 5a and 5b show a top and side view respectively of an LED with the micro-lens attached.
Figure 5B:
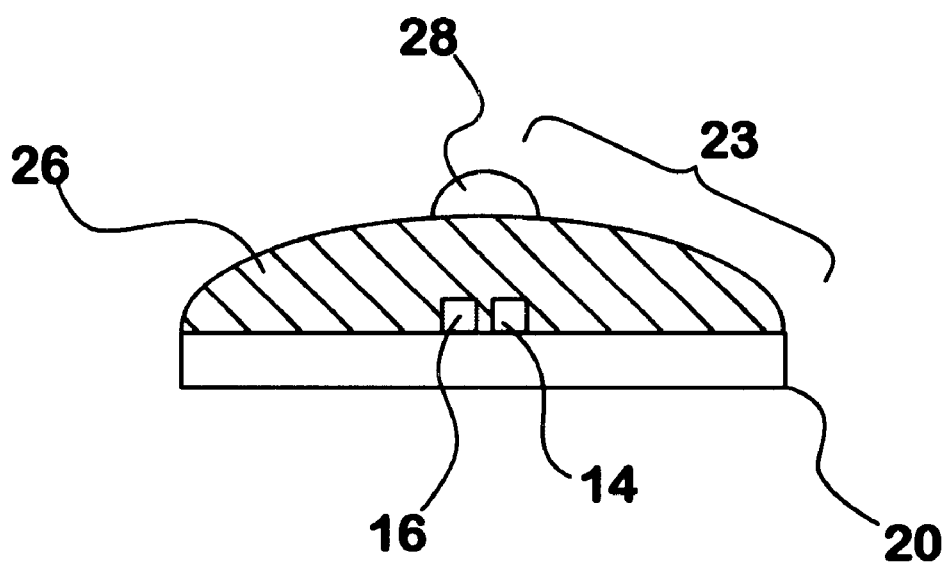

FIGS. 5a and 5b show a top and side view of the LED of FIG. 3 with the micro-lens of the current invention attached thereto. This is the preferred embodiment of the invention. The lens consists of an opaque area 26, which may be composed of any material which does not allow the transmission of light, including plastic or aluminum, and a focusing area 28, which may typically be composed of a glass or plastic molded lens. The opaque and focusing areas 26 and 28 respectively compose the micro-lens 23. In the top view of FIG. 5a it can be seen that opaque area 26 narrows the perimeter where light reflected from substrate 10 can project. Prior to the insertion of the micro-lens, light reflected from substrate 10 in the area between arrow 27 and arrow 29 would be transmitted however, with the micro-lens in place, this light is masked and it not transmitted outside of the LED. The blocking or masking of the reflected light from the area covered by opaque portion 26 of the micro-lens reduces the size of the specularities, as can be seen in FIG. 2.

Figure 6:
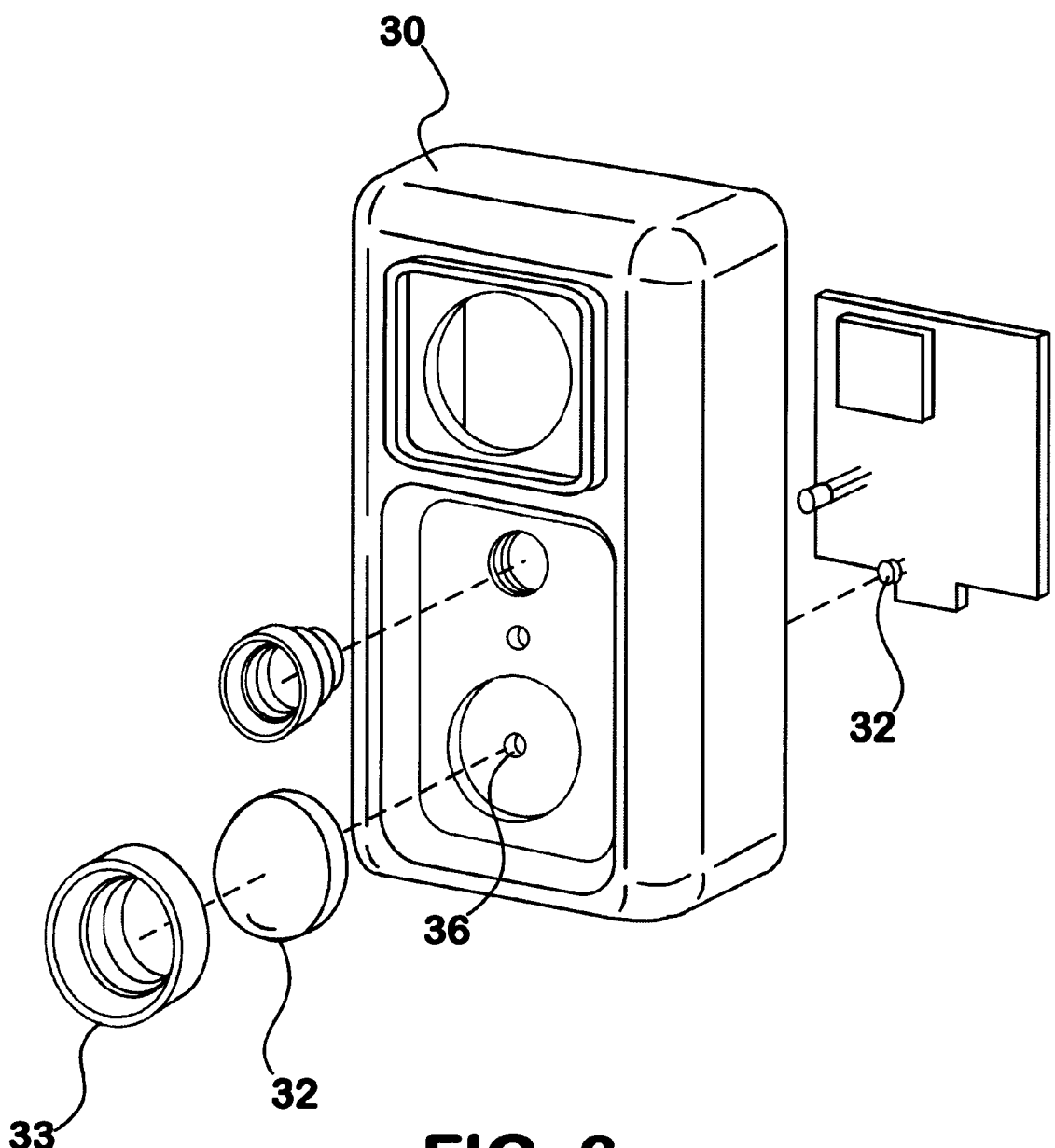
FIG. 6 shows a second embodiment of the micro-lens.

FIG. 6 shows a second embodiment of the invention in which the opaque area of the micro-lens is replaced by a beveled hole 36 into which LED 34 is inserted and wherein the focussing portion of the micro-lens is replaced by lens 32 positioned away from the housing of LED 34. LED 34 is inserted into hole 36 in housing 30. Preferably hole 36 would be of the same size as inside perimeter 29 in FIG. 5a. Lens 32 serves to focus the light being emitted from die 12 or 14. Bevel 33 holds lens 32 in place in housing 30.

Figure 7:
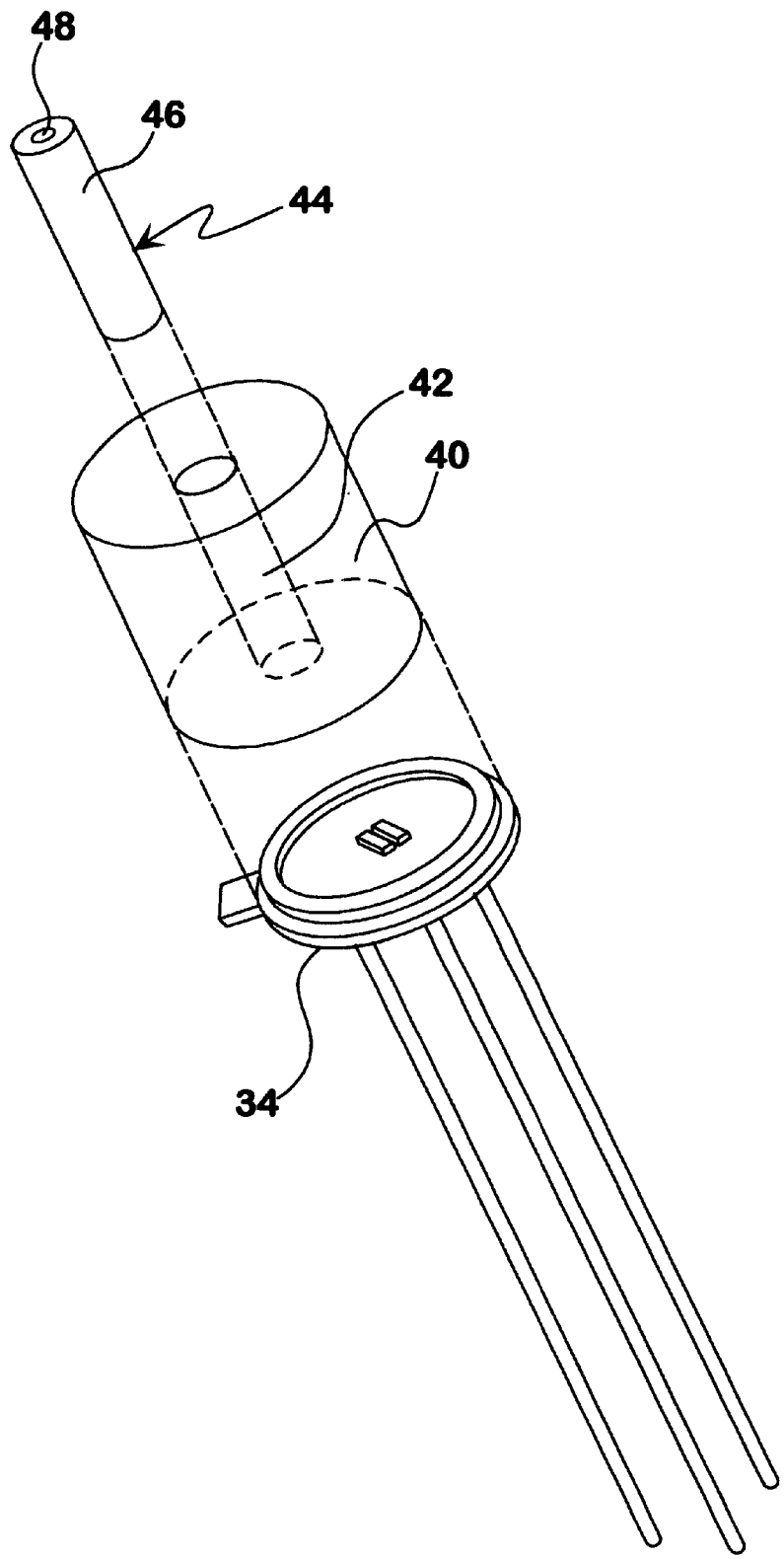
FIG. 7 shows a third embodiment of the micro-lens.

FIG. 7 shows yet another embodiment of the invention. A standard LED 34, without the standard commercial lens attached is utilized. A barrel of opaque material 40 is attached to the housing of LED 34. Barrel 40 has bore 42 drilled axially therethrough. Bore 42 has a diameter approximately the same size as inside perimeter 29 in FIG. 5a, or just enough to allow both dies in LED 34 to directly emit light into bore 42. Barrel 40 serves the purpose of masking the light reflected from substrate 10, as does opaque area 26 in FIG. 5a. In place of the focusing lens 28 in FIG. 5b, which narrows the beam of light according to the equation previously given, a piece of fiber optic cable 44 is utilized. Optical carrier 48 is disposed in jacket 46 and serves the same purpose as lens portion 28 in FIG. 5b and lens 32 in the second embodiment of FIG. 6. One advantage with the use of the embodiment of FIG. 7 is that the length of the fiber optic cable 44 is not a factor in its ability to focus the beam of light. Instead it is the optical properties of carrier 48 that are important. Therefore LED 34 can be placed remotely within the housing of the unit in which it is installed and the fiber optic cable can be routed to the outside of the unit near the axis of the video camera.

I have disclosed herein certain specific examples of this invention and its application in practical use. The illustrations and explanations herein are given solely to acquaint others skilled in the art with this invention and the principles, so that others skilled in the art may be enabled to modify the invention and to adapt and apply it in numerous forms each as may be best suited to the requirement of a particular use. It should be distinctly understood that my invention is not limited thereto but may be variously embodied within the scope of the following claims.

I claim:

1. A micro-illuminator comprising:
    an LED having at least one die which emits light containing direct and reflected components;
    a barrel composed of an opaque material, said barrel having a bore drilled axially therethrough, said bore having a diameter not greater than an area large enough to contain all of said dies; and
    a length of fiber optic cable, attached to said barrel such that the longitudinal axis of said barrel and the longitudinal axis of said fiber optic cable lie along a straight line; wherein said barrel masks at least some of said reflected light emitted from said LED and wherein said light emitted directly by said dies of said LED travel up through said bore and thereafter through said length of fiber optic cable.

2. The micro-illuminator of claim 1 wherein light emitted the end of said fiber optic cable opposite said barrel is focused at an angle not less than 5 degrees and not more than 45 degrees.

* * * * *